US007548598B2

(12) United States Patent
Nieto (10) Patent No.: US 7,548,598 B2
(45) Date of Patent: Jun. 16, 2009

(54) METHOD AND APPARATUS FOR ITERATIVELY IMPROVING THE PERFORMANCE OF CODED AND INTERLEAVED COMMUNICATION SYSTEMS

(75) Inventor: John Wesley Nieto, Rochester, NY (US)

(73) Assignee: Harris Corporation, Melborne, FL (US)

( * ) Notice: Subject to any disclaimer, the term of this patent is extended or adjusted under 35 U.S.C. 154(b) by 612 days.

(21) Appl. No.: 10/407,125

(22) Filed: Apr. 7, 2003

(65) Prior Publication Data

US 2004/0196935 A1 Oct. 7, 2004

(51) Int. Cl.
*H04B 1/10* (2006.01)

(52) U.S. Cl. .................. 375/350; 375/233; 375/232; 375/148; 375/147; 375/341; 375/326; 375/340; 370/329; 370/335

(58) Field of Classification Search .......... 375/350, 375/148, 233, 147, 232, 326, 341, 340; 714/752; 370/329, 335

See application file for complete search history.

(56) References Cited

U.S. PATENT DOCUMENTS

| 4,365,338 | A | | 12/1982 | McRae et al. | |
|---|---|---|---|---|---|
| 5,297,166 | A | * | 3/1994 | Batruni | 375/233 |
| 7,035,316 | B2 | * | 4/2006 | Smee et al. | 375/147 |
| 2003/0117647 | A1 | * | 6/2003 | Kaku et al. | 358/1.15 |
| 2004/0006733 | A1 | * | 1/2004 | Hamalainen et al. | 714/752 |
| 2004/0179589 | A1 | * | 9/2004 | Yousef et al. | 375/233 |
| 2005/0047489 | A1 | * | 3/2005 | Yousef et al. | 375/148 |

FOREIGN PATENT DOCUMENTS

WO  WO0072540  11/2000
WO  WO02101940  12/2002

OTHER PUBLICATIONS

Eleftheriou, E. and Falconer, D., "Adaptive Equalization Techniques for HF Channels," IEEE Journal on Selected Areas in Communications, vol. SAC-5, No. 2, Feb. 1987, pp. 238-246.
Nieto, J.W., "Iterative Equalization and Decoding of Stanag 4539 9600 BPS HF Waveforms," presented at Communication Systems, Networks, and Digital Signal Processing Symposium, Staffordshire University, School of Computing, Jul. 15-17, 2002.
Gosse, K., et al., "Iterative Hybrid Decision-Aided Equalization for Wireless Communications," ICC 2001 IEEE International Conference on Communications, Helsinki, Finland, Jun. 11-14, 2001.
Lee, Y., et al., "Adaptive DFE with Regularization for Indoor Wireless Data Communications," IEEE Global Telecommunications Conference, Phoenix, AZ, Nov. 3-8, 1997.
European Search Report for EP04008377.

* cited by examiner

*Primary Examiner*—Chieh M. Fan
*Assistant Examiner*—Eva Puente
(74) *Attorney, Agent, or Firm*—Duane Morris LLP (57) ABSTRACT

A system and method for improving performance of a digital communication system using forward error correction and interleaving. In the system, the channel equalization values are iteratively refined by providing a feedback of the estimated signal to the channel equalizer. More specifically, the system determines at least one estimate associated with a decision of a received signal corresponding to a transmitted signal, modulates at least one estimate and determines the equalization factors dependent upon the received signal and the modulated estimate. The system further iteratively determines the at least one estimate for a known number of iterations. In one aspect the system further combines a current one of the decisions with prior ones of the decisions in a known manner in the iterative process.

15 Claims, 10 Drawing Sheets

METHOD AND APPARATUS FOR ITERATIVELY IMPROVING THE PERFORMANCE OF CODED AND INTERLEAVED COMMUNICATION SYSTEMS

BACKGROUND OF THE INVENTION

This application is related to the field of digital communications and more specifically to iteratively improving the performance of digital communication systems which use forward error correction and interleaving to overcome the effects of communication channels.

The area of digital communications has undergone a significant transformation in the last ten years because of the discovery of turbo codes. As is known in the art, turbo codes are a class of error correction codes which enable reliable communications with power efficiencies close to the theoretical limit. Turbo codes incorporate two fundamental concepts: concatenated coding and iterative decoding. In order to achieve power efficiencies close to theoretical limits, Soft In Hard Out (SIHO) devices typical to most communication systems, such as Viterbi decoders, were replaced with Soft In Soft Out devices (SISO). These devices allowed for dramatic improvements in performance as soft information was shared and improved on each iteration. However, computational complexity was also increased.

The "turbo" concept can be applied to more than just Forward Error-Correction (FEC) code schemes. For example, waveforms developed for the High Frequency (HF) band conventionally place an interleaver between the FEC code scheme and the transmitted symbols. The interleaver re-sorts the data bits of the FEC encoded data stream to provide a time-diversity in the bit-pattern to separate adjacent bits. Time-diversity is advantageous as it de-correlates errors that are introduced in digital signals by slow fading channels and/or multipath. If the interleaver is not used, the correlation of adjacent errors contributes to rendering the FEC encoding schemes ineffective as adjacent errors may not be corrected.

Figure 1:
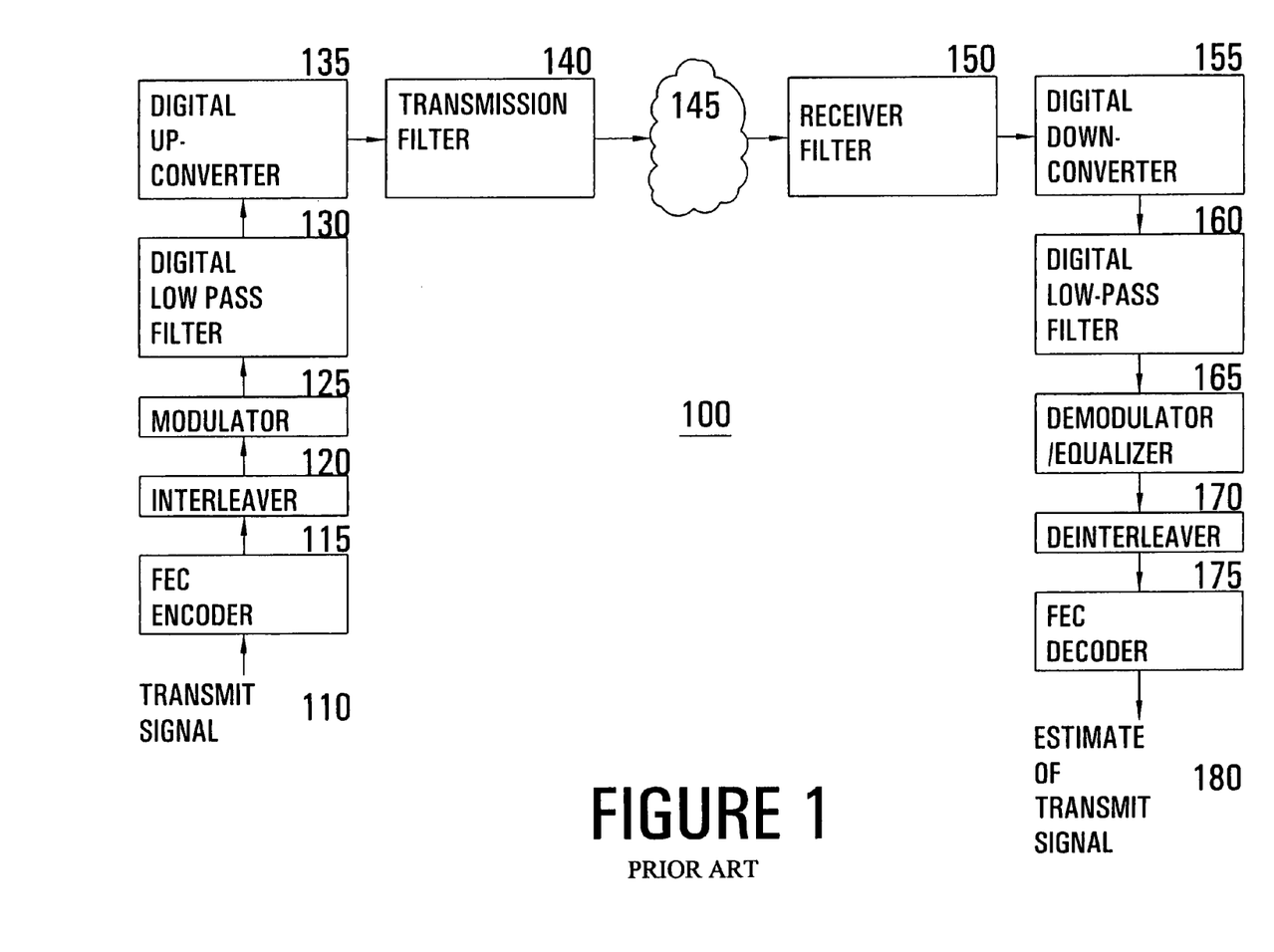
FIG. 1 illustrates a block diagram of a conventional digital communication system.

FIG. 1 illustrates a conventional digital communication system 100 using a "turbo" concept. In this system, transmit signal 110 is applied to encoder 115, which applies a Forward Error Correcting (FEC) code to signal 110. The FEC encoded signal is then applied to interleaver 120 to impose time-diversity into the encoded bit-stream. The encoded, time-diverse signal is then applied to modulator 125, which organizes individual bits into symbols based on the transmission system characteristics. For example, in a QPSK system two (2) bits are selected for each transmission symbol. Similarly, in a 16-QAM system four (4) bits are selected for each transmission symbol. The transmission symbols are then applied to transmission Digital Low-Pass Filter 130, which removes high frequency signal components that may be induced by switching instantaneously from one symbol to the next symbol. The symbols are next applied to Digital Up-Converter 135 to up-convert the symbols to a conventional carrier frequency, which is then band-limited by Transmit Filter 140. In a conventional HF communication system, for example, the up-converted carrier signal is 1800 Hz with a bandwidth of 3 kHz (up-conversion to 1800 Hz creates a real audio signal that can be sent to a radio). The up-converted signal is then transmitted over a wireless communication network or channel represented as communication cloud 145.

Channel 145 may be characterized as a multipath, time-varying environment that produces both time and frequency dispersion of the transmitted signal. For example, one source of multipath in long-haul HF communications is reflections of signals from different layers in the ionosphere. Another example is multiple reflections that occur between the earth's surface and the ionosphere. This gives rise to an effect known as multi-hop propagation of the transmitted signal. Accordingly, the received signal may include several echoes or modes, separated in time by a matter of milliseconds, i.e., time dispersion and/or may experience a frequency dispersion. Frequency dispersion occurs when each received signal is itself fading due to the nature of the ionosphere reflection. In some channels, the multipath or delay spread can range up to six (6) milliseconds and the fading rate or Doppler Spread can be as high as 5 Hz.

The transmitted signal, when received by a receiving system, is applied to Receiver Filter 150, which limits the bandwidth of the received signal to a bandwidth commensurate with the transmission bandwidth. The bandwidth-limited received signal is then applied to Digital Down-Converter 155 and Digital Low-Pass filter 160. The down-converted signal is then demodulated by demodulator 165, de-interleaved by deinterleaver 170 and FEC decoded by decoder 175, in well known processes that remove the modulation, interleaving and encoding performed at the transmitter. Decoded output signal 180 represents an estimate of transmit signal 110 as the communication path induced-errors contribute to the receiving system incorrectly determining the value of a transmitted bit or symbol.

Significant advances have been made in the estimation of a transmitted symbol by using devices that generate soft information at the output of the device in the demodulation process (i.e., SISO devices). However, generating soft output information requires new Soft-in, Soft-out (SISO) devices that produce soft outputs rather than hard decisions, i.e., one or zero (SIHO devices), regarding the transmitted symbol or bit. Examples of SISO devices are the Soft Output Viterbi Algorithm (SOVA) or Maximum A Posteriori (MAP) algorithm, e.g., Bahl Coche Jelinek Raviv (BCJR), which are computationally more complex than conventional hard decision devices, such as the well known Viterbi decoder, Reed-Solomon Decoder, Golay decoder, etc. Hence, the improvement in the estimation of transmitted signals, measured as system performance, has been obtained with increased complexity in processing and cost of soft decision devices. Furthermore, a new equalizer device would be needed to replace a standard equalizer since it would need to be able to use hard or soft information from the decoder to improve its performance (standard equalizers have no way of using this additional information). Note that standard equalizers are SISO devices since their input is the received data and their output symbol estimates.

Thus, there is a need for a system that provides improved system performance while using less costly and less computationally complex devices. In addition to the computational savings, the ability to use well understood (mature and standard) equalizer and decoder algorithms is a significant advantage of this invention.

Accordingly, it is an object of the present invention to provide a novel system and method for determining channel equalization factors to improve, for example, the reception performance of a transmitted signal.

It is another object of the present invention to provide a novel system and method for determining channel equalization factors to improve, for example, the reception performance of a transmitted signal over a digital communication channel.

It is yet another object of the present invention to provide a novel method for determining channel equalization factors to improve, for example, the reception performance of a transmitted signal by determining at least one estimate associated with a decision of a received signal corresponding to the transmitted signal, modulating the estimate, and determining the equalization factors dependent upon the received signal and modulated estimate.

It is still another object of the present invention to provide a novel system for determining channel equalization factors to be applied to a digital channel equalizer to improve, for example, the reception performance of a signal transmitted over a digital communication channel.

It is a further object of the present invention to provide a novel system for determining channel equalization factors to be applied to a digital channel equalizer to improve, for example, the reception performance of a signal transmitted over a digital communication channel where the system includes circuitry that determines at least one estimate associated with a decision of a received signal corresponding to the transmitted signal, circuitry that modulates the estimate, and circuitry that determines the equalization factors dependent upon the received signal and modulated estimate.

It is to be understood that these drawings are solely for purposes of illustrating the concepts of the invention and are not intended as a definition of the limits of the invention. The embodiments shown in FIGS. 1 through 9 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

A system and method for improving performance of a digital communication system using forward error correction and interleaving is disclosed. In the system, the channel equalization values are iteratively refined by providing a feedback of the estimated signal to the equalizer. More specifically, the system comprises a means to determine at least one estimate associated with a decision of a received signal corresponding to a transmitted signal, means to modulate at least one estimate and means to determine the equalization factors dependent upon said received signal and the modulated estimate. The system further comprises means to iteratively determine at least one estimate for a known number of iterations. In one aspect the system further comprises means for combining a current one of the decisions with prior ones of said decisions in a known manner in the iterative process.

Figure 2A:
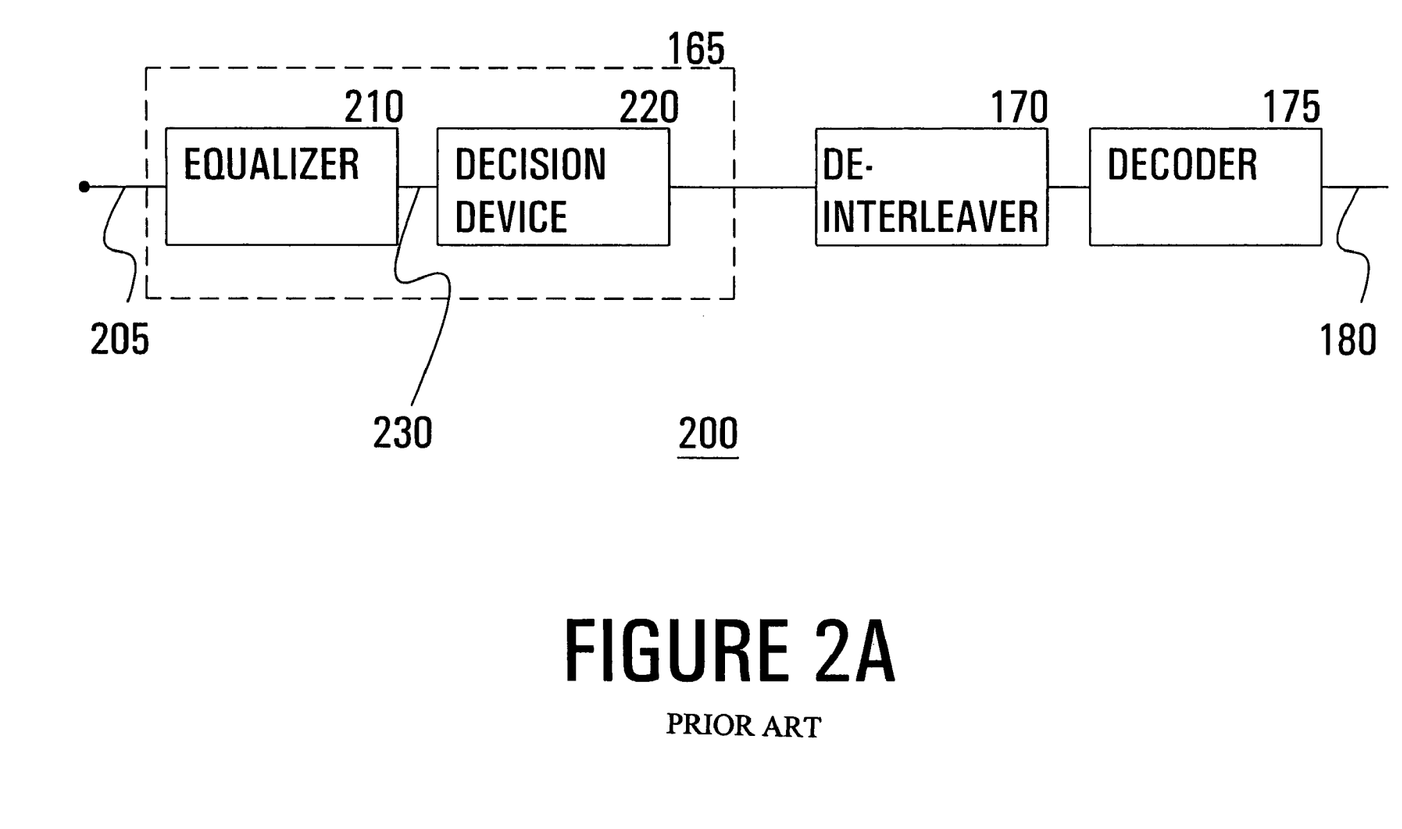
FIG. 2a illustrates a block diagram of a conventional digital communication system modulator.

FIG. 2a illustrates a block diagram 200 of a more detailed view of the conventional demodulation process shown in FIG. 1. In this illustration, the down-converted, band-limited, received signal 205, from digital filter 160 (not shown), is applied to demodulator 165 through equalizer 210. Equalizer 210 determines factors that are representative of a measure of the error induced in transmitted signal 110 by channel 145. The factors are then applied to the received signal, conventionally on a symbol basis, to remove the effects of transmission channel 145 induced error on the transmitted signal 110.

The equalized symbol 230 is next applied to decision device 220. Device 220 generates at least one decision, or determination, regarding the transmitted bits from the equalized signal or symbol 230. In one aspect, when decision device 220 is a hard decision device (HDD), equalized symbol 230 is converted to the appropriate number of bits and each bit decision may be determined as a "0" or a "1". When decision device 220 is a soft decision device (SDD), equalized symbol 230 is converted to appropriate number of bits and each bit decision may be determined as one of several values that are representative of the confidence the demodulator process has of the value of that bit or symbol. The output of device 220 is next applied to deinterleaver 170 and to decoder 175 for de-interleaveing and decoding, respectively.

Figure 2B:
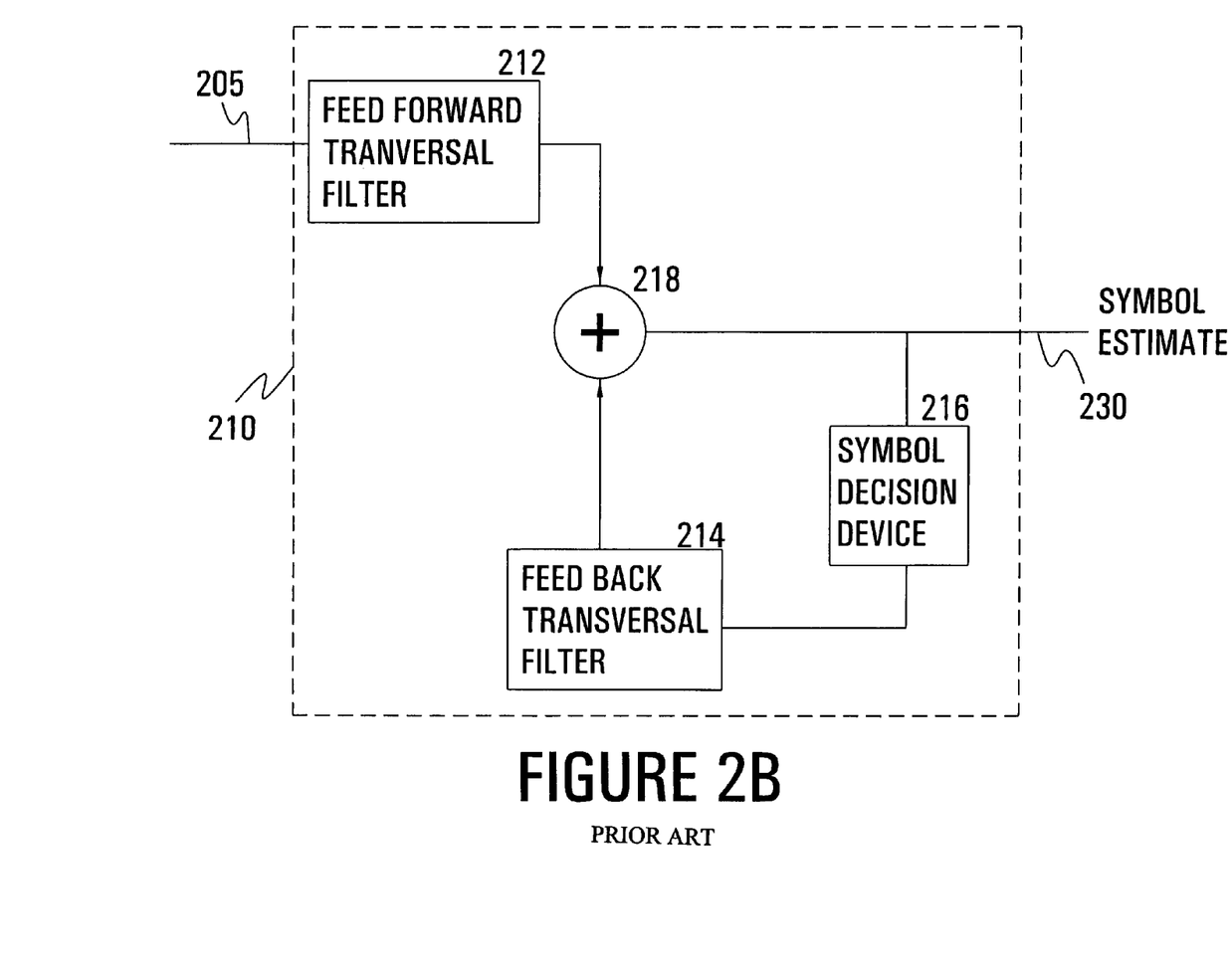
FIG. 2b illustrates a block diagram of a conventional digital equalizer.

FIG. 2b illustrates a conventional decision feedback digital equalizer (DFE) 210. In this illustrated DFE, the outputs of feed-forward transversal filter 212 and feed-back transversal filter 214 are combined by adder 218 to produce an equalized value of a current signal. The equalized value 230 of a current symbol, as will be shown, includes contributions of known levels of subsequently transmitted and previously transmitted estimated symbols. More specifically, feed-forward transversal filter 212, includes a plurality of "taps" or factors that apply known levels to a known number of symbols received subsequent to a current symbol. The values of the "taps" or factors and corresponding subsequently received symbols are combined and applied to a current symbol to partially compensate for errors induced in transmission channel 145 by subsequently transmitted symbols. Similarly, feed-back transversal filter 214 includes a plurality of "taps" or factors that weight or adjust equalized values 230 of previously transmitted symbols. The values of the "taps" and corresponding previously transmitted symbols equalized values 230 are then combined and applied to a currently received symbol to partially compensate for errors induced by previously transmitted symbols in transmission channel 145.

The weighted output of feed-forward filter 212 and feed-back filter 214 are applied to adder 218 to include the contribution of both subsequently transmitted and previously transmitted symbols to the value of a current symbol. In this case, the output of adder 218, and equalizer 210, is a weight adjusted value 230 of the transmitted symbol 110. The weight adjusted value 230 of a current symbol is further applied to feed-back filter 214 that is then applied to a known number of subsequently transmitted symbols.

Although a DFE is illustrated in the present embodiment, it should be understood that the invention disclosed herein is also applicable to block equalizers and, hence, the use of block equalizers is contemplated to be within the scope of the invention. Block equalizers are more fully discussed in commonly-assigned U.S. Pat. No. 4,365,338, entitled "Technique for High Rate Digital Transmission Over a Dynamic Dispersive Channel," issued Dec. 21, 1982.

Figure 3:
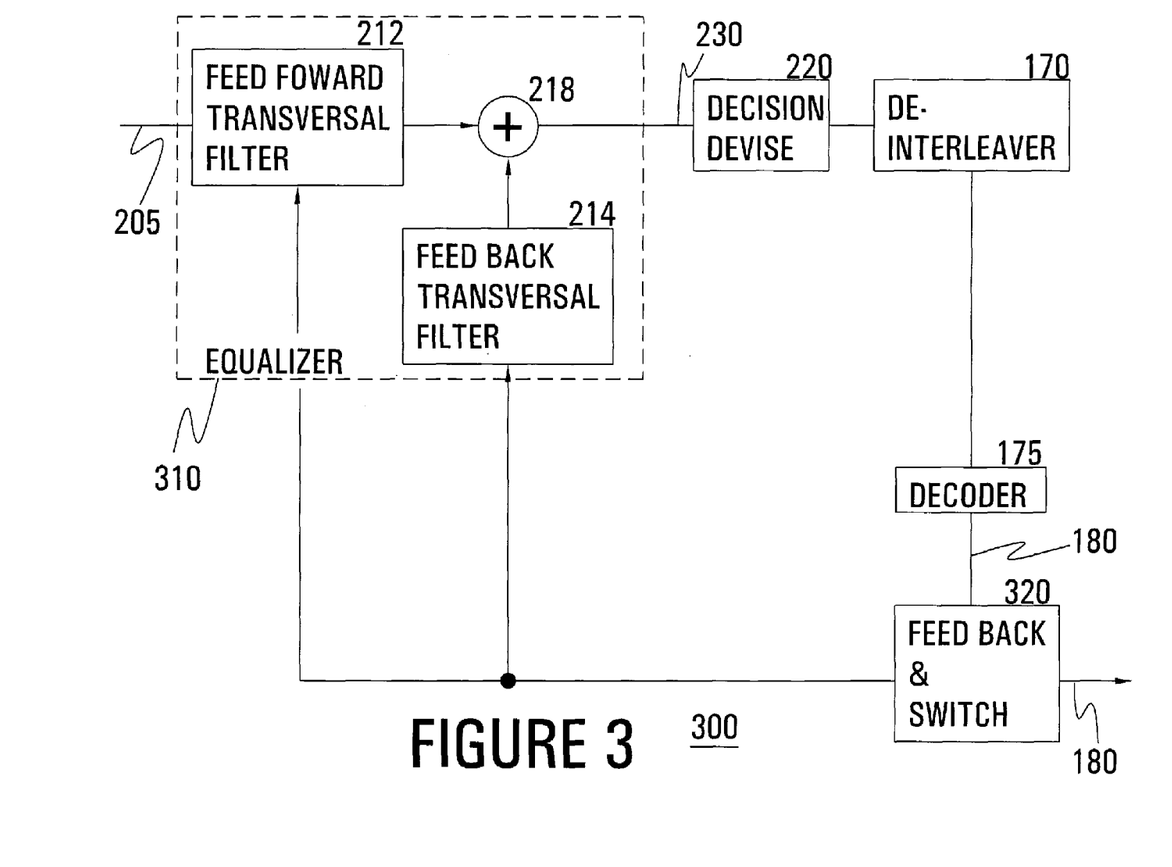
FIG. 3 illustrates a block diagram of an exemplary embodiment of a demodulator equalizer in accordance with the principles of the invention.

FIG. 3 illustrates a block diagram of an exemplary embodiment 300 of a demodulator in accordance with the principles of the invention. In the exemplary embodiment, down-converted, bandwidth-limited symbol or signal 205 is applied to equalizer 310, decision device 220 and deinterleaver 170, as previously described. The decision outputs of deinterleaver 170 are then applied to decoder 175 and to feedback process & switch, referred to as block 320. Feedback process and switch 320 operate to provide a feedback of the decoded output 180 to equalizer 310 or to provide the decoded output 180 to a next device (not shown).

In one aspect of the invention a signal representative of decoded output 180 is provided to feed-back transversal filter 214 for use in determining equalization factors. In another aspect, which is illustrated, decoded output 180 is also provided to feed-forward transversal filter 212 for use in determining equalization factors. Hence, in accordance with the principles of the invention, decoded output 180 rather than equalizer output 230 is used for determining equalization factors.

Figure 4:
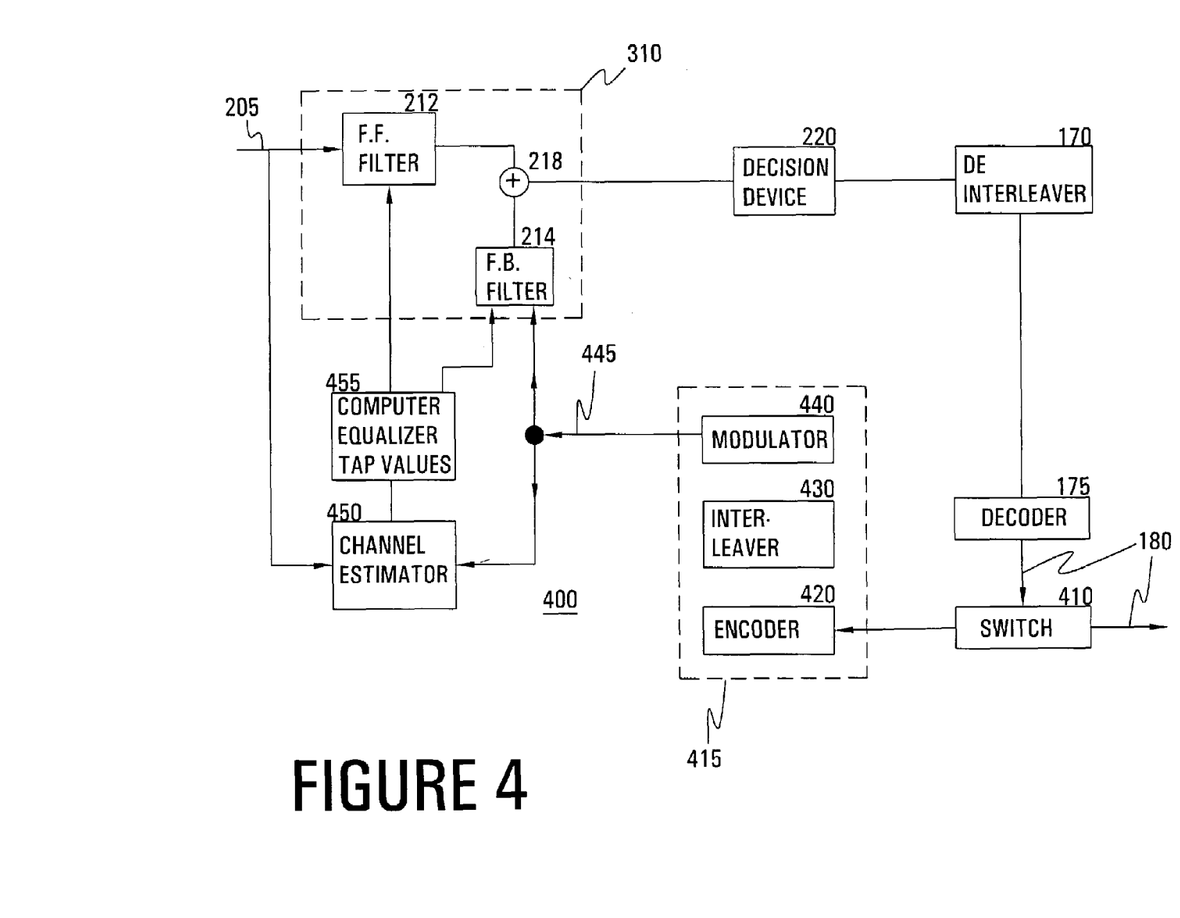
FIG. 4 illustrates a block diagram of a first aspect of a demodulator in accordance with the principles of the invention.

FIG. 4 illustrates a block diagram 400 of first exemplary aspect of a demodulator equalizer in accordance with the principles of the invention. In this aspect, down-converted, bandwidth-limited symbol or signal 205 is applied to equalizer 310. The output 230 of equalizer 310, is then applied to decision device 220, deinterleaver 170 and decoder 175, as previously described. Output 180 of decoder 175 is then applied to switch 410, which is operable to direct the output 180 to a next device (not shown) or to remodulator 415.

Remodulator 415 operates to modulate output 180 in a manner similar to the transmitting blocks shown in FIG. 1. More specifically, remodulator 415 includes FEC encoder 420, interleaver 430 and modulator 440, which are similar to those described with regard to FIG. 1 and need not be discussed in detail again. The remodulated signal 445 is then applied to feed-back filter 214 and channel estimator 450.

Channel estimator 450 operates to improve the channel estimate by convolving the remodulated signal or symbol 445 with the appropriate channel estimate of demodulator process and then compared to received signal or symbol 205. In one aspect of the invention, a Least Means Square (LMS) adaptive algorithm may be used to determine the induced error between the remodulated estimate of received signal 445 and the actual received signal 205. In another aspect, a Recursive Least Squares (RLS) or other adaptive algorithm may be used to determine an improved channel estimate.

The improved channel estimate is applied to block 455 to determine appropriate tap or weight or equalization factor values. The determined tap values may then be applied to feed-back filter 214 and/or feed-forward filter 212.

In the preferred embodiment shown, remodulator 415 operates on a symbol basis as equalizer 310 conventionally also operates on symbols. However, although the invention is shown in a preferred embodiment, operation on received bits is also contemplated to be within the scope of the invention.

In this exemplary operation, the symbol estimate output by block 216 is disconnected from equalizer 310 (in essence removing the feedback path from equalizer to itself via feedback taps) and the estimated symbols from the remodulation process are used instead. Also, the improved channel estimates, represented through the feed-forward and feedback filter tap or equalization factor values, are applied to the received data 205 in equalizer 310. The refined estimate of the transmitted signal is then applied to decision device 220, interleaver 170 and decoder 175, as previously described.

Switch 410 operates to determine and limit the number of iterations that output 180 is providing to remodulator 415. Accordingly, improved estimates of errors in channel 145 and corresponding tap values may be obtained over a known number of iterations.

Although not shown, it should be appreciated that signal delays are appropriately incorporated into the process to accommodate signal propagation among the illustrated components and insure proper synchronization of the signal processing. For example, a sufficiently large delay may be included in the path between signal 205 and channel estimate 450 to allow for proper synchronization of signal 205 and a corresponding re-modulated estimate, i.e., output 180, of signal 205.

Figure 5:
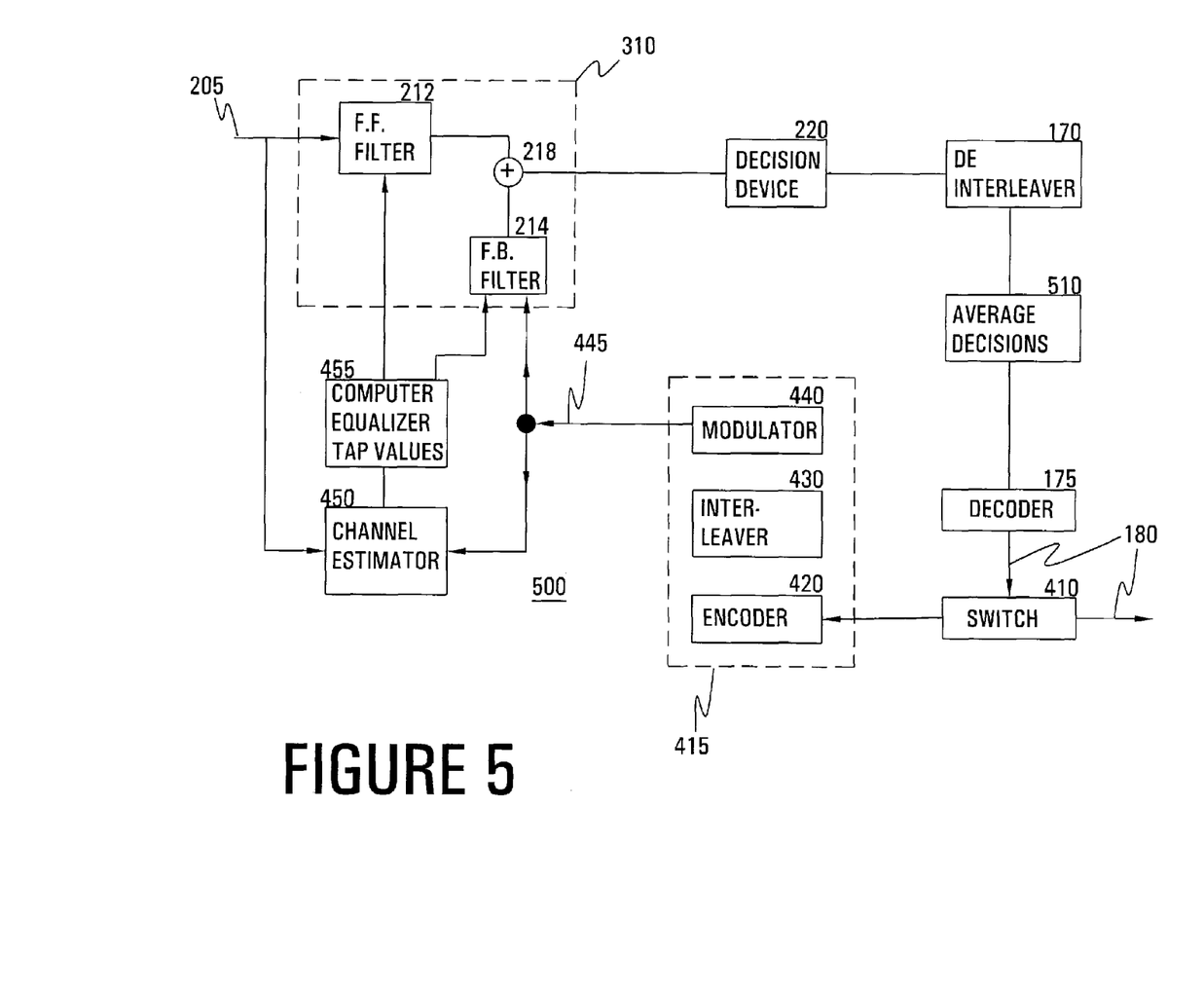
FIG. 5 illustrates a block diagram of a second aspect of a demodulator in accordance with the principles of the invention.

FIG. 5 illustrates a block diagram 500 of a second exemplary aspect of a demodulator in accordance with the principles of the invention. In this embodiment, down-converted, bandwidth-limited received symbol or signal 205 is applied to equalizer 310, decision device 220, deinterleaver 170, as previously described. The output symbol decisions or determinations of deinterleaver 170 are then applied to processor 510, which operates to collect the outputs of deinterleaver 170 over a known period or a known number of iterations. The collected symbol decisions or determinations are then provided to decoder 175 for subsequent decoding, as previously discussed. In this case, the use of symbol decisions collected of a known number of iterations is advantageous as it assists in removing singular errors that may occur in the symbol decision process.

In one aspect of the invention, decision processor 510 may operate to determine a signal decision by computing an average of the symbol decisions of deinterleaver 170 for each iteration. An exemplary average, shown in equation 1, may be obtained as:

$$\bar{S}_1 = S_1 \qquad [1]$$

$$\bar{S}_2 = \frac{1}{2}S_2 + \frac{1}{2}S_1$$

$$\bar{S}_3 = \frac{1}{3}S_3 + \frac{1}{3}S_2 + \frac{1}{3}S_1$$

$$\bar{S}_n = \sum_{i=1}^{n} \frac{1}{n} S_i$$

where $\bar{S}_i$ is the average corresponding to the i-th iteration;
$S_1$ is the value of the first or initial sample; and
$S_i$ is the value of the i-th sample.

In another aspect, decision processor 510 is operable to determine a signal decision as a weighted average of the decision values. A weighted average may be selected, for example, as:

$$\bar{S}_i = \frac{k-j}{k}S_i + \frac{1}{k}\bar{S}_{i-1}; \text{ and} \qquad [2]$$

$$\bar{S}_1 = S_1$$

where $\bar{S}_i$ is the weighted average for the i-th sample;
$\bar{S}_{i-1}$ is the previous weighted average;
$S_i$ is the value of the i-th sample; and
k and j are weighting factors, e.g., 4 and 1, respectively.

Methods for determining weighted averages are well known in the art, and although limited examples of averages and weight averages are shown herein, it should be understood that other forms of weighted averages are contemplated and considered within the scope of the invention.

Table 1 tabulates typical frequency and time-dispersion values corresponding to a direct path and a first and a second non-direct path, i.e., multipath, for different channel conditions.

TABLE 1

Channels under Test

| Channel | Direct | First Non-Direct | Second Non-Direct |
|---|---|---|---|
| AWGN (A) | 0 Hz | — | — |
| Poor (P) | 1 Hz | 1 Hz, 2 ms | — |
| Rician (R) | 0 Hz | 2 Hz, 2 ms | — |
| 2-Path (2P) | 0 Hz | 0 Hz, 2 ms | — |
| 3-Path (3P) | 0 Hz | 0 Hz, 1 ms | 0 Hz, 2 ms |

In this case, an All-White Gaussian Noise (AWGN) channel is characterized as exhibiting a zero dispersion in frequency in a direct path. A Poor channel is characterized as exhibiting a 1 Hz dispersion in a direct path and a 1 Hz dispersion in a first non-direct path. A Rician model of a communication channel is representative of a communication link between two stations in which a direct path, i.e., surface wave or line-of-sight path, and a second channel, e.g., reflection off the ionosphere add together. The received signal from the line-of-sight path (non-fading path) and the reflection path (fading path) are typically separated in time. Furthermore, a satellite communication channel may be modeled as a Rician channel in which there is a single path exhibiting a fixed and a fading component. This is case, there is no separation in time of a received signal; however, there is typically a dispersion in the received frequency. Hence, in the analysis presented herein, a Rician channel is characterized as exhibiting a two-millisecond (2 ms) delay and two hertz (2 Hz) dispersion in a first non-direct channel. Channel models referred to as "2-path" and "3-path" channels are similarly characterized as exhibiting one-millisecond and two-millisecond delays in first and second non-direct paths, respectively, with zero frequency dispersion.

Figure 6:
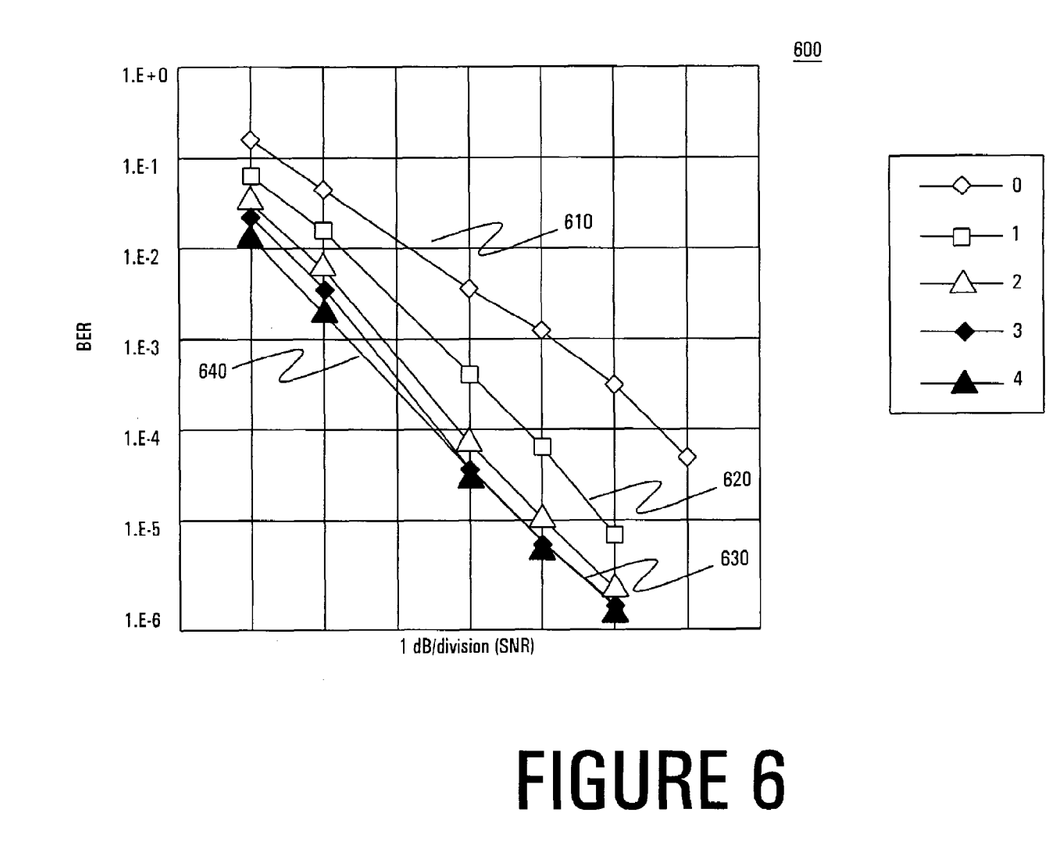
FIGS. 6-9 illustrate graphs of system performance improvements for the demodulator or shown in FIG. 5.

FIG. 6 illustrates a graph 600 of the Bit-Error-Rate (BER) v. Signal-to-Noise Ratio (SNR) performance of a channel exhibiting Poor channel characteristics with iterative improvement of equalization factors in accordance with the principles of the invention. In this example, typical system performance is shown as graph 610. Graph 640 is representative of a condition wherein iterative equalization and decoding gains become small. As shown, at a BER of $10^{-3}$ a 2 dB improvement in performance is achieved, shown as graph 620, when a single improvement in equalization factors is made in accordance with the principles of the invention. A further 0.5 dB improvement, as shown by graph 630, is achieved with a second improvement in equalization factors. As is further shown with a third and fourth iteration of improvement in equalization factors further improvements in performance are achieved. However, the performance improvements are substantially reduced.

Figure 7:
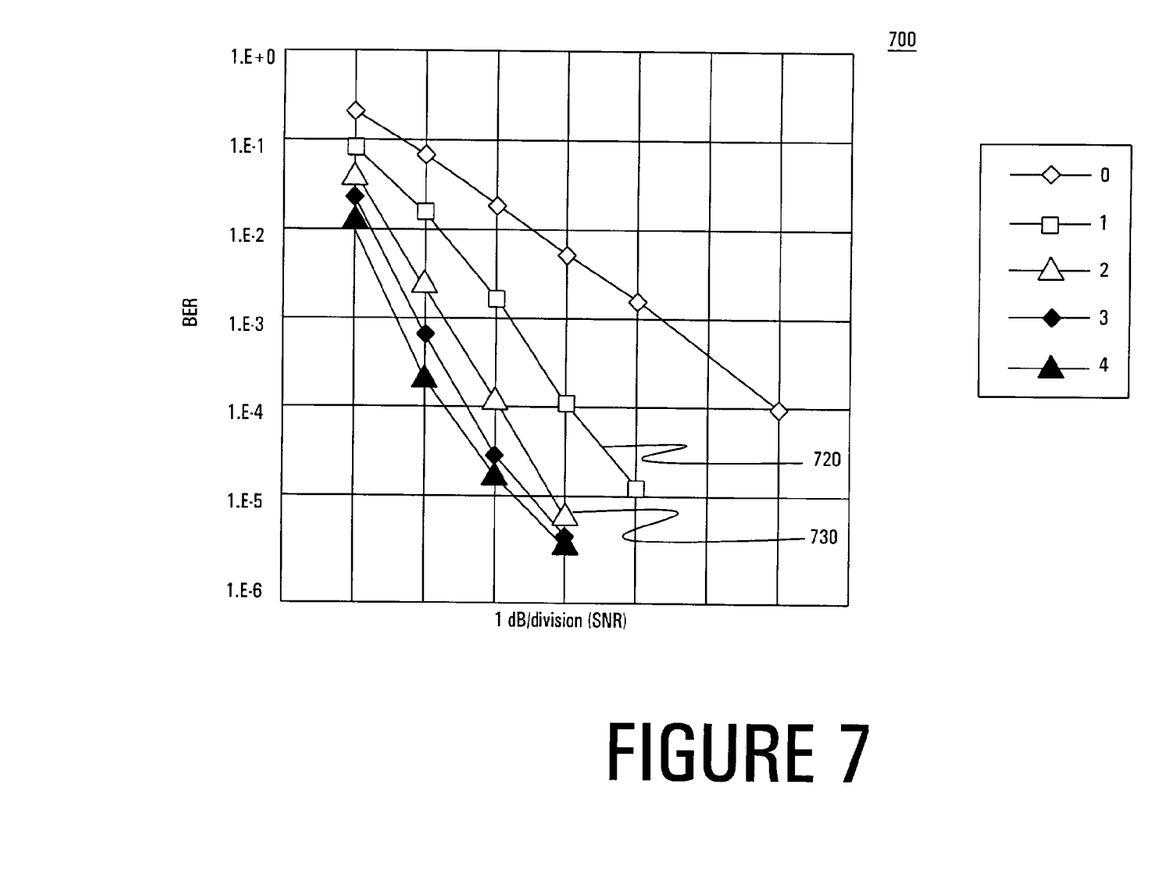

FIG. 7 illustrates a graph 700 of the Bit-Error-Rate (BER) v. Signal-to-Noise Ratio (SNR) performance of a channel exhibiting Rician channel characteristics with iterative improvement of equalization factors in accordance with the principles of the invention. In this example, significant improvement in performance is achieved with a first iterative, a shown by graph 720, and second iterative, as shown by graph 730, improvement in equalization factor values.

Figure 8:
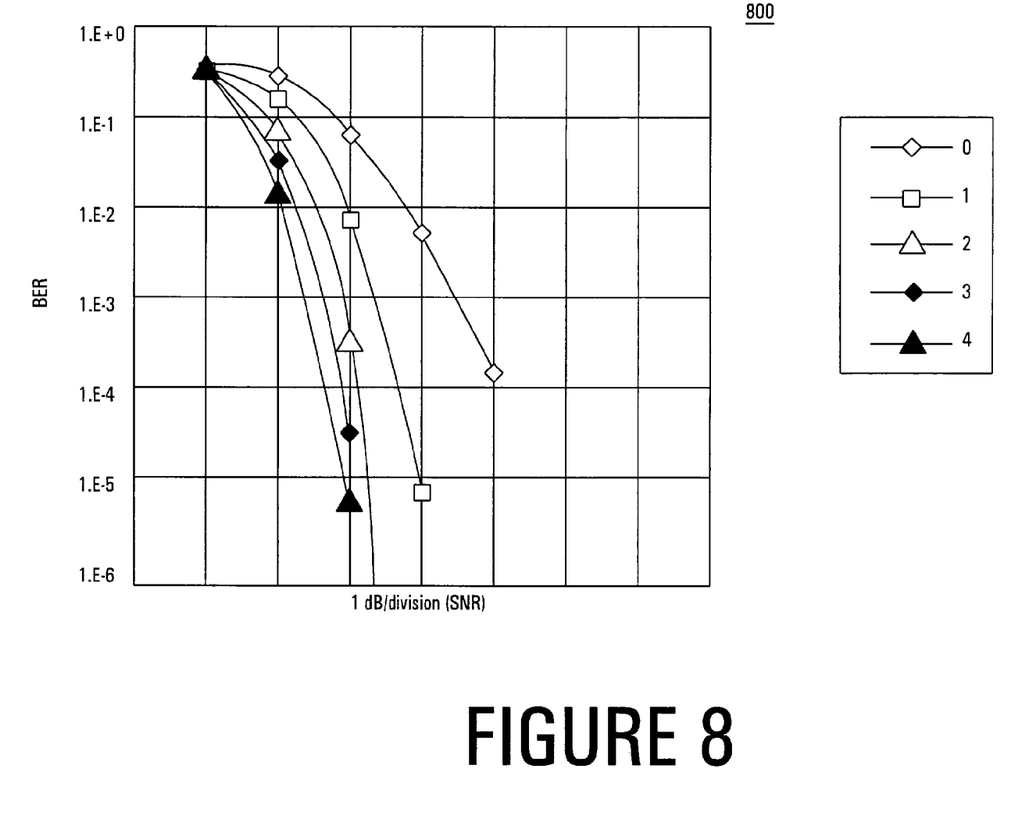
Figure 9:
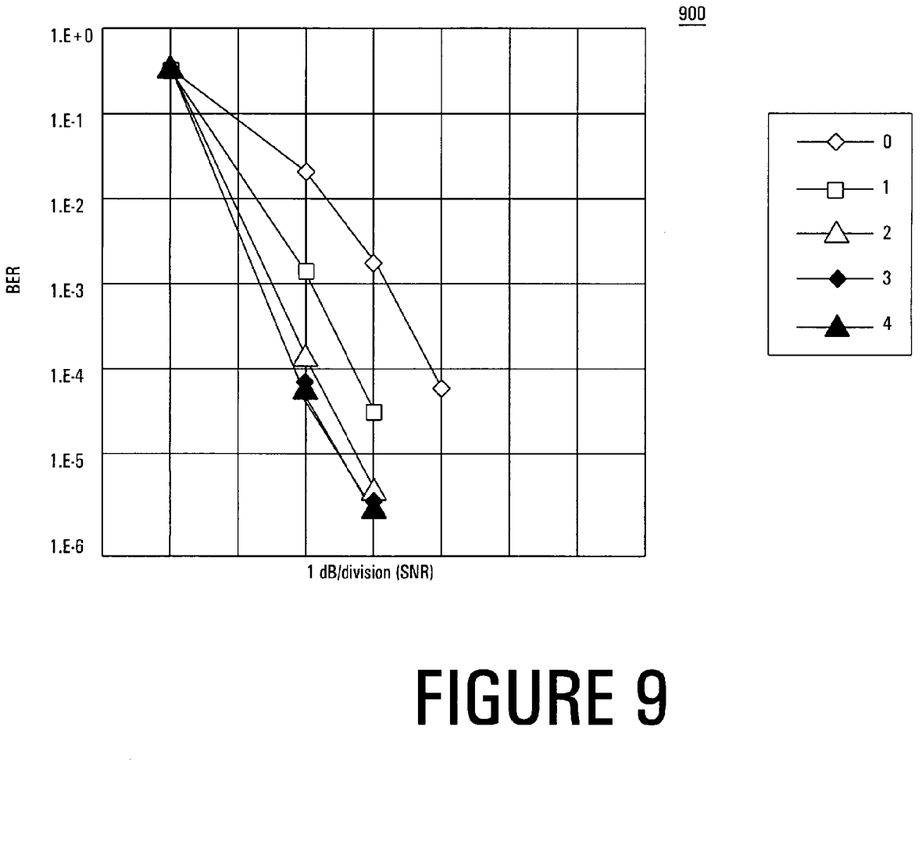

FIGS. 8 and 9 illustrate graphs of the Bit-Error-Rate (BER) v. Signal-to-Noise Ratio (SNR) performance of channels exhibiting 2-path and 3-path channels with iterative improvement of equalization factors in accordance with the principles of the invention. Again, significant improvement in performance is achieved with a first or second iterative improvement in equalization factors. Hence, in a preferred embodiment, switch 410 allows for at least one feedback iteration of output 180.

Although the present invention has been described with regard to soft decision devices, it should be understood that the principles of the invention are equally applicable to hard decision devices and those are contemplated and considered to be within the scope of the invention.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for determining channel equalization factors associated with a digital channel to improve reception performance of a signal transmitted over a digital communication channel, comprising the steps of:
   a. determining at least one estimate associated with a decision of a received signal corresponding to said transmitted signal wherein said determining includes combining a current decision with a previous decision in a predetermined manner;
   b. modulating said estimate;
   c. determining said equalization factors dependent upon said received signal and said modulated estimate;
   d. updating a channel estimate as a function of said equalization factors;
   e. modifying an equalizer to utilize said channel estimate; and
   f. iteratively repeating steps (a)-(e) for a predetermined number of iterations,
   wherein the step of modulating said estimate comprises encoding said estimate with a Forward Error Correction (FEC) scheme, interleaving said encoded estimate, and modulating said encoded, interleaved estimate.

2. The method as recited in claim 1, wherein said predetermined manner is selected from the group consisting of: initialization, average, and weighted average.

3. The method as recited in claim 1, wherein said decision is associated with devices selected from the group consisting of: hard decision, and soft decision.

4. The method as recited in claim 1, wherein said equalization factors are determined between said received signal and said modulated estimate based on an algorithm selected from the group consisting of: Least Means Square (LMS) and Recursive Least Squares (RLS).

5. The method as recited in claim 1, wherein said received signal is selected from the group consisting of: bit and symbol.

6. A system for determining channel equalization factors applied to a digital channel equalizer to improve reception performance of a signal transmitted over a digital communication channel, comprising:
   means to iteratively determine at least one estimate associated with a decision of a received signal corresponding to said transmitted signal wherein said means to iteratively determine includes combining a current decision with a previous decision in a predetermined manner;

means to iteratively modulate said at least one estimate;

means to iteratively determine said equalization factors dependent upon said received signal and said modulated estimate, means to iteratively update a channel estimate as a function of said equalization factors; and means to iteratively modify an equalizer to utilize said channel estimate;

wherein said means to literatively modulate comprises an encoder, an interleaver, and a modulator.

7. The system as recited in claim 6, wherein said predetermined manner is selected from the group consisting of: initialization, average, and weighted average.

8. The system as recited in claim 6, wherein said means for determining said decision includes devices selected from the group consisting of: hard decision and soft decision.

9. The system as recited in claim 6, wherein said equalization factors are determined between said received signal and said modulated estimate based on an algorithm selected from the group consisting of: Least Means Square (LMS) and Recursive Least Squares (RLS).

10. The system as recited in claim 6 wherein said received signal is selected from the group consisting of: bit and symbol.

11. A method for improving reception performance of a signal transmitted over a digital communication channel comprising the steps of:

a. demodulating a received signal having frames of known and unknown symbols to produce demodulated data;

b. equalizing the demodulated data with an equalizer to produce a plurality of equalized symbols;

c. determining at least one estimate from said equalized symbols, the at least one estimate associated with a decision of the received signal corresponding to the transmitted signal;

d. using the at least one estimate to update a channel estimate for at least one frame;

e. modifying the equalizer to utilize an estimate of computed symbols;

f. computing bit soft decisions from the estimate of computed symbols;

g. deinterleaving the computed bit soft decisions;

h. averaging deinterleaved bit soft decisions with previous soft decisions; and    i. iteratively repeating steps (a)-(h) for a predetermined number of iterations.

12. The method of claim 11 wherein said equalizer is a block equalizer.

13. The method of claim 11 wherein said equalizer is a decision feedback equalizer.

14. The method of claim 11 wherein said at least one estimate associated with a decision is an estimate of an entire interleaved block of transmitted symbols.

15. The method of claim 14 further comprising the step of storing all estimates for the length of the entire interleaved block.

\* \* \* \* \*